(12) United States Patent
Pracht et al.

(10) Patent No.: US 8,976,499 B2
(45) Date of Patent: Mar. 10, 2015

(54) E-FUSE SYSTEM FOR SUPPLYING CURRENT TO A LOAD ALONG MORE THAN ONE PATH

(75) Inventors: Kelly Pracht, Tomball, TX (US); Samuel M Babb, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1353 days.

(21) Appl. No.: 12/768,242

(22) Filed: Apr. 27, 2010

(65) Prior Publication Data

US 2011/0261495 A1   Oct. 27, 2011

(51) Int. Cl.
*H02H 9/02* (2006.01)

(52) U.S. Cl.
CPC ..................... *H02H 9/02* (2013.01)
USPC ............................ 361/93.7; 361/87

(58) Field of Classification Search
CPC .......... H03K 17/0822; H03K 17/0828; H02H 3/087; H02H 3/006; H02H 9/02; H03F 1/52
USPC ................................. 361/93.7, 87
See application file for complete search history.

(56) References Cited

U.S. PATENT DOCUMENTS

| 4,429,339 | A * | 1/1984 | Jaeschke et al. | 361/93.7 |
| 5,917,312 | A * | 6/1999 | Brkovic | 323/282 |
| 7,023,191 | B2 * | 4/2006 | Bernacchia et al. | 323/282 |
| 2005/0078024 | A1 * | 4/2005 | Harrington | 341/155 |

* cited by examiner

*Primary Examiner* — Jared Fureman
*Assistant Examiner* — Nicholas Ieva
(74) *Attorney, Agent, or Firm* — Hewlett-Packard Patent Department

(57) ABSTRACT

An electronic fuse system includes plural current paths, each operable to be coupled between a power source and a load, and each including a switching element and a current sensing resistor in series with the path such that the path passes current when the switching element is turned on and does not pass current when the switching element is turned off. A controller has two sense inputs and a control output. The control output is coupled to the switching elements in each of the plural current paths and is operable to turn them all on or off simultaneously responsive at least in part to the sense inputs. A summing resistor is connected across the two sense inputs, and coupling circuitry is operable to couple voltages appearing across the current sensing resistors to the summing resistor.

16 Claims, 3 Drawing Sheets

E-FUSE SYSTEM FOR SUPPLYING CURRENT TO A LOAD ALONG MORE THAN ONE PATH

BACKGROUND

An electronic fuse, also known as an "e-fuse," includes a transistor switching element and a current sensing resistor that are both placed in the path of a supply current. The electronic fuse also includes a controller that is configured to turn on the switching element to supply current along the path and to turn off the switching element if the supplied current exceeds a predetermined threshold.

In some electronic systems it is necessary to supply current to a load using more than one high-power path. A rack-mounted server computer system provides one example of this. In such a server system, it is common to provide power to a motherboard through sockets that connect the motherboard to a backplane. Current from a single power supply is routed to the motherboard through the backplane via the sockets. If a single socket assembly were used for this purpose, the socket assembly would have to be robust enough to handle the entire maximum rated current requirement of the motherboard load. But such a socket would be bulky and expensive. Instead, two separate sockets are sometimes used instead of one. In this arrangement, the current supplied to the load is distributed such that there are two high-power paths, one through each socket. Smaller and less expensive sockets may be used in this case because the amount of current passing through each socket is lower than the total current drawn by the load.

In any such arrangement it is usually necessary to employ an electronic fuse to limit the current being supplied to the load—such as to the motherboard load in the case of the server computer system. In architectures that use more than one high-power path, however, a design challenge arises regarding where to place the electronic fuse.

DETAILED DESCRIPTION

Figure 1:
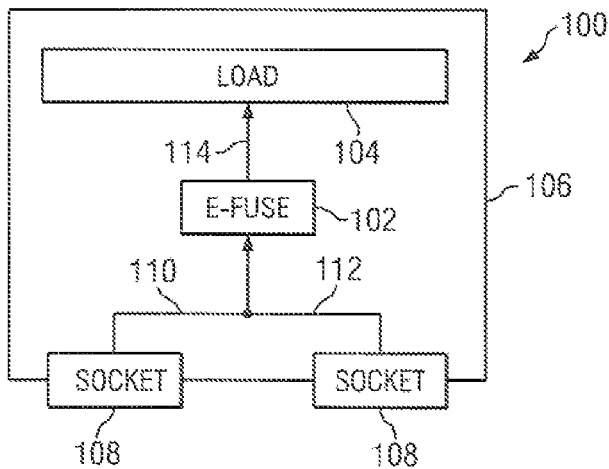
FIG. 1 is a block diagram illustrating a power supply architecture that employs a single e-fuse according to the prior art.

FIG. 1 illustrates a power supply architecture 100 that employs a single e-fuse 102 according to the prior art. A load 104 on a motherboard 106 is supplied using two sockets 108 and two high-power paths 110, 112. Both high-power paths 110 and 112 are joined and routed to load 104 as a single path 114 through e-fuse 102 as shown. E-fuse 102 is intentionally placed on the board at roughly the same distance from each of sockets 108 so that the impedance of paths 110 and 112 will be substantially equal. The problem with such an arrangement is that the placement of e-fuse 102 makes the length and the impedance of paths 110 and 112 higher than they would be if the paths were shorter. The higher impedance of paths 110, 112 results in voltage drop across them and associated power losses. Consequently, additional copper tends to be used to create such paths so as to minimize their total impedance. This increases cost.

Figure 2:
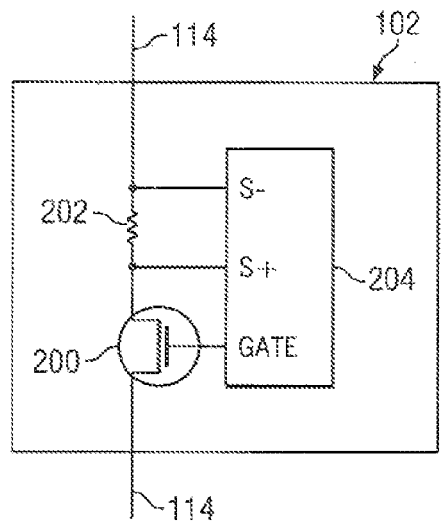
FIG. 2 is a schematic diagram illustrating the prior art e-fuse of FIG. 1 in more detail.

FIG. 2 illustrates prior art e-fuse 102 in more detail. High-power path 114 passes in series through a field effect transistor ("FET") 200 and a current sense resistor 202. Current sense resistor 202 is connected across two sense inputs, s+, s−, of a controller 204. A gate control output of controller 204 is connected to the gate of FET 200 and is operable to turn FET 200 on when it is desired to pass current through path 114 and to turn it off when it is desired to prevent current from passing through path 114. The gate control output is responsive to sense inputs s+, s−. In practice, supporting elements are connected to controller 204 according to conventional means to determine, among other things, at what threshold of current in path 114 will controller 204 turn off FET 200.

Figure 3:
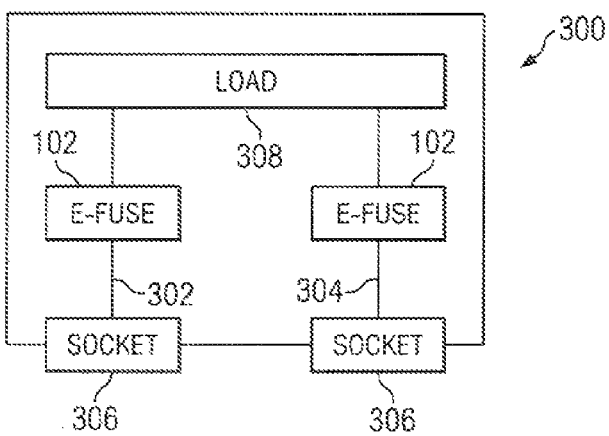
FIG. 3 is a block diagram illustrating a power supply architecture that employs two e-fuses and that exhibits undesirable behaviors.
Figure 4:
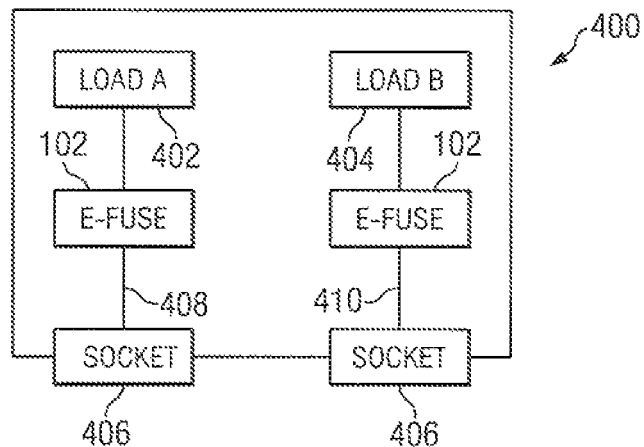
FIG. 4 is a block diagram illustrating a power supply architecture that employs two e-fuses with a split load and that exhibits undesirable design complexity and expense.

Many prior art controllers like controller 204 are available on the market today. By way of example, one such controller is part number ISL6115A made by INTERSIL AMERICAS, INC. Uniformly, though, data sheets for prior art controllers 204 teach that the printed circuit board trace routing between sense resistor 202 and controller 204 should be as direct and as short as possible with zero current in the sense lines. This is so because any noise on the lines connecting sense resistor 202 to controller 204 can cause false over-current events and other inaccuracies. The voltage levels across sense resistor 202 are typically on the order of 50 to 100 millivolts. Thus the prior art teaches that the distance should be minimized between controller 204 and the sense resistor 202 that is placed in series with high-power path 114. This prior art teaching, if followed, leads to power supply architectures like architectures 300 and 400 shown in FIGS. 3 and 4, respectively.

In architecture 300, the two high-power paths 302, 304 are kept separate so that each path is routed independently from sockets 306 to load 308. Because the paths are separated, two e-fuses 102 have to be used instead of one to protect against over-current conditions. Each e-fuse 102 in architecture 300 has its own controller 204 because of the need to keep the controllers close to the sense resistors on each path. Although architecture 300 would avoid the length and resulting high impedance of paths 110, 112 as in architecture 100, it likely would not work properly in practice. This is because e-fuses 102 in architecture 300 are not commonly controlled. The result would likely be that one of the two e-fuses would attempt to source all of the current to load 308, for example in the instance where one of the e-fuses turned on before the other. In such a situation, components and traces can be burned and one of the e-fuses may trip even though there is no fault in load 308.

An adjustment can be made to architecture 300, resulting in architecture 400. In architecture 400, the load has been separated into two separate, smaller loads 402, 404. High-power path 408 supplies load 402. High-power path 410 supplies load 404. This design successfully addresses the problem in which one e-fuse may turn on before the other. Since each of loads 402, 404 is designed not to require any more current than can safely be provided through one of sockets 406, the system will operate safely and satisfactorily even in that condition. On the other hand, dividing load 308 into two separate, equal loads 402 and 404 can be difficult from a design point of view. And the resulting system will be more complex and more expensive to manufacture due to the separate power planes required on the printed circuit board.

Figure 5:
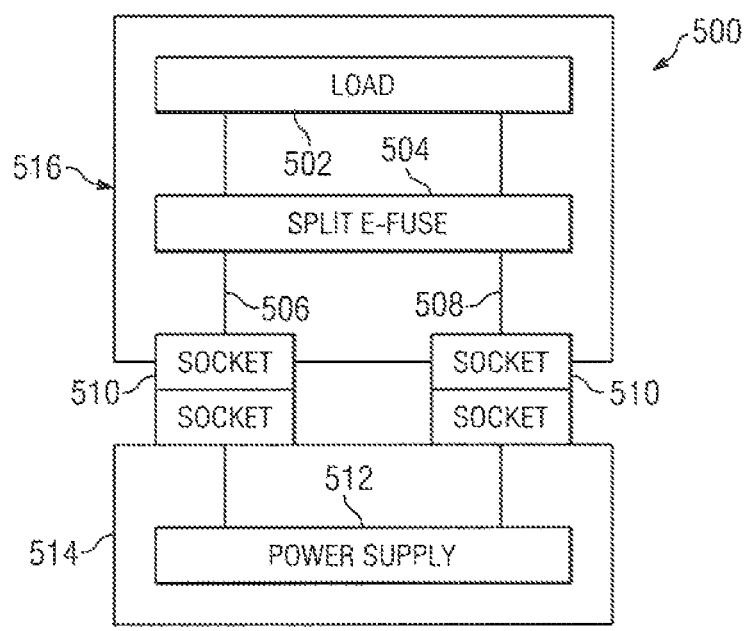
FIG. 5 is a block diagram illustrating a power supply architecture that employs a split e-fuse according to an example embodiment of the invention.

A better architecture 500 is shown in FIG. 5. In architecture 500, load 502 is not divided as it is in architecture 400 but rather is left unified as in architectures 100 and 300, thus eliminating the complexity and expense of dual power planes. Instead, a new type of "split" e-fuse 504 is provided such that control of high-power paths 506, 508 is coordinated. Socket assemblies 510 may be like those in the prior art architectures. Load 502 may be any load, such as a computing device for example. System 500 may be any system, such as a server computer system for example. Split e-fuse system 504 may be located on the same printed circuit board 516 as load 502, while power source 512 may be located elsewhere, such as on backplane printed circuit board 514.

Figure 6:
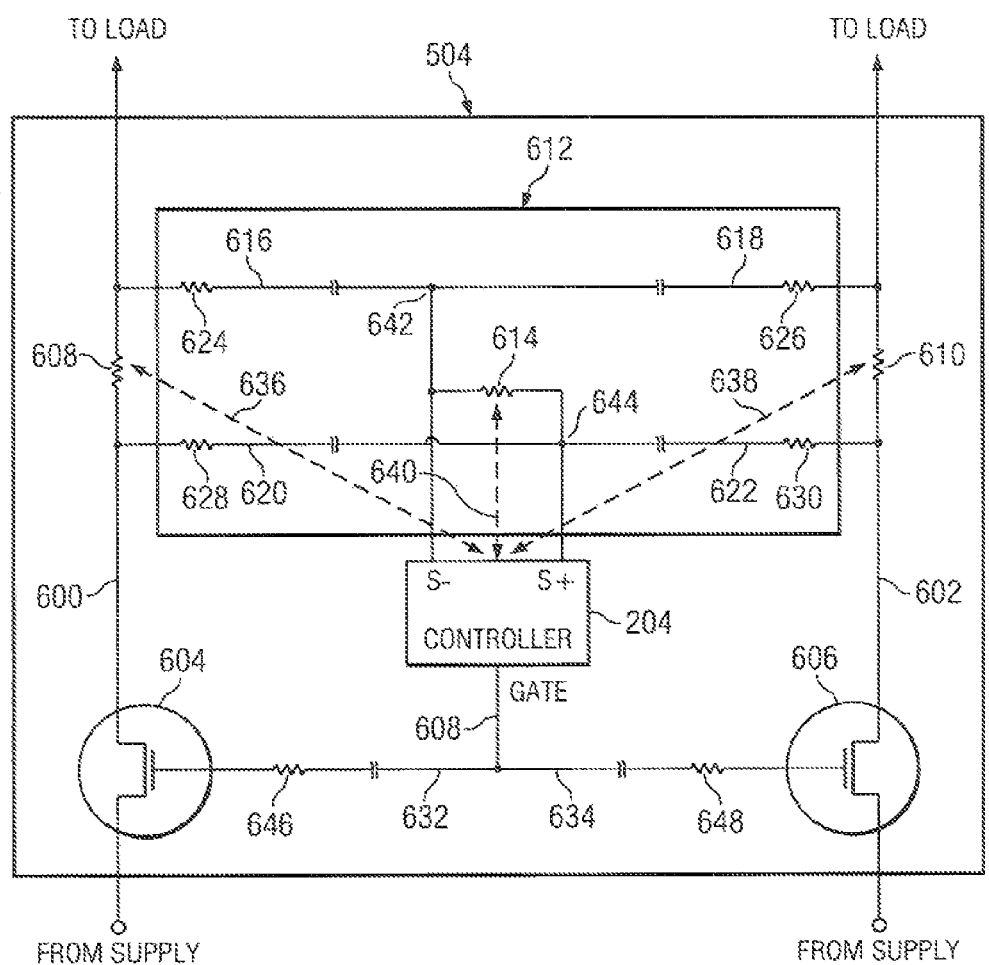
FIG. 6 is a schematic diagram illustrating the split e-fuse of FIG. 5 in more detail and according to an example embodiment of the invention.

FIG. 6 illustrates an example embodiment of split e-fuse 504 in more detail. Within split e-fuse system 504, at least two separate high-power paths 600, 602 are provided. Each is operable to couple a power source such as power source 512 to a load such as load 502. Switching elements 604, 606 are placed in series with paths 600, 602, respectively. Each of switching elements 604, 606 is configured to pass current when turned on and not to pass current when turned off. Switching elements 604, 606 may be constructed using any kind of suitable switching device, such as transistors for example. In the embodiment shown, each of the elements is a FET.

Controller 204 has two sense inputs, s+, s− and a control output 608 operable to turn switching elements 604, 606 on and off substantially simultaneously responsive at least in part to the sense inputs. Controller 204 may be conventional. Any variety may be used.

Two separate current sense resistors 608, 610 are placed in series with high-power paths 600, 602, respectively. Coupling circuitry 612 is configured to present a sense voltage s+, s−, to the sense inputs of control circuitry 204 such that the sense voltage is a function of the voltages that appear across current sense resistors 608, 610 during operation of split e-fuse system 504.

In the embodiment shown in FIG. 5, the sense voltage applied to controller 204 is a scaled sum of the voltages that appear across current sense resistors 608, 610. This can be accomplished in a variety of ways, such as by forming a voltage divider network with coupling circuitry 612 and a summing resistor 614 as shown. In one embodiment, coupling circuitry 612 couples each of the sensing resistors 608, 610 in parallel to summing resistor 614 via non-zero-impedance paths 616-622, thus effectively coupling to summing resistor 614 the voltages appearing across sensing resistors 608, 610. Each of paths 616-622 may be designed to have substantially the same impedance. Similarly, impedances along paths 632 and 634 coupling control output 608 to switching elements 604, 606 may be designed to be substantially equal to one another.

In a specific embodiment, coupling resistors 624-630 may be used. Coupling resistor 624 is connected between the top terminal of current sense resistor 608 and the left terminal of summing resistor 614. Coupling resistor 626 is connected between the top terminal of current sense resistor 610 and the left terminal of summing resistor 614. Coupling resistor 628 is connected between the bottom terminal of current sense resistor 608 and the right terminal of summing resistor 614. Coupling resistor 630 is connected between the bottom terminal of current sense resistor 610 and the right terminal of summing resistor 614.

Contrary to the teachings of the prior art, architecture 500 places one or both of current sense resistors 608, 610 remotely so that they are not physically proximate to the sense inputs of controller 204. This is indicated by the broken lines in paths 616-622. This enables high-power paths 600, 602 to be shortened relative to their lengths in architecture 100, which helps to reduce power loss due to voltage drops on the high-power paths. Indeed, one or both of distances 636, 638 between current sense resistors 608, 610 and the sense inputs of controller 204 can be at least twice as long as distance 640 between summing resistor 614 and the sense inputs of controller 204. Summing resistor 614 may be located close to the sense inputs of controller 204.

Architecture 500 also successfully addresses the problems exhibited by architectures 300 and 400. The new split e-fuse system 504 provides a common control for switching elements 604, 606 by virtue of their connection to the same control output 608 of controller 204. And load 502 need not be divided.

Although architecture 500 is illustrated as having just two high-power paths 600, 602, other embodiments may include more than two paths. The latter embodiments may be formed simply by replicating one of the high-power paths shown and by attaching the coupling resistors for the new path to nodes 642, 644.

Resistor values for the various embodiments of the invention may vary with the application and in accordance with good design practices. In one example embodiment, sense resistors 608, 610 were 0.001 Ohms each. Coupling resistors 624-630 as well as resistors 646, 648 were 10 Ohms each. Summing resistor 614 was 50 Ohms. In yet other embodiments, the coupling resistors may be eliminated as the coupling paths themselves will have non-zero impedance in applications having sufficiently long printed circuit board traces.

While the invention has been described in detail with reference to certain embodiments thereof, the described embodiments have been presented by way of example and not by way of limitation. It will be understood by those skilled in the art and having reference to this specification that various changes may be made in the form and details of the described embodiments without deviating from the spirit and scope of the invention as defined by the appended claims.

What is claimed is:

1. An electronic fuse system, comprising:
   plural current paths, each operable to be coupled between a power source and a load, and each including a switching element and a current sensing resistor in series with the path such that the path passes current when the switching element is turned on and does not pass current when the switching element is turned off;
   a controller having two sense inputs and a control output, wherein the control output is coupled to the switching elements in each of the plural current paths and is operable to turn them all on or off simultaneously responsive at least in part to the sense inputs;
   a summing resistor connected across the two sense inputs; and
   coupling circuitry operable to couple voltages appearing across the current sensing resistors to the summing resistor.

2. The system of claim 1, wherein:
   the number of plural current paths is two; and
   each of the switching elements has a respective control input coupled to the control output of the controller, the control inputs of the switching elements being coupled to each other.

3. The system of claim 1, wherein:
   the switching elements comprise FETs; and the switches have respective switch-control inputs, each of the control output of the controller and the switch control inputs being coupled to each of the others via electrical paths containing no active circuit elements.

4. The system of claim 1, wherein:
the coupling circuitry and the summing resistor comprise a voltage divider network that provides a scaled sum of the voltage across the sensing resistors.

5. The system of claim 1, wherein:
the current sensing resistors are located farther away from the sense inputs than is the summing resistor.

6. The system of claim 1, wherein:
the coupling circuitry couples each current sensing resistor in parallel to the summing resistor via non-zero-impedance paths.

7. The system of claim 6, wherein:
each of the paths has substantially the same impedance.

8. The system of claim 1, wherein:
impedances between the control output of the control circuitry and control inputs of each switching element are substantially equal.

9. An electronic fuse system, comprising:
first and second current paths, each operable to couple a power source to a load;
first and second switching elements in series with the first and second current paths, respectively, and configured to pass current when turned on and not to pass current when turned off, each of switching elements having a respective control input, the control inputs of the switching elements being coupled to each other so that said switches may be turned on and off simultaneously by a single control signal;
control circuitry having sense inputs and a control output, the control output coupled to the control inputs of the first and second switching elements and operable to turn them on and off simultaneously responsive at least in part to the sense inputs;
first and second current sense resistors in series with the first and second current paths, respectively; and
coupling circuitry configured to present a sense voltage to the sense inputs of the control circuitry such that the sense voltage is a function of voltages that appear across the first and second current sense resistors during operation of the fuse system, wherein the coupling circuitry comprises:
first, second, third and fourth coupling resistors and a summing resistor; wherein:
the summing resistor is connected across the sense inputs of the control circuitry;
the first coupling resistor is connected between one terminal of the first current sense resistor and one terminal of the summing resistor;
the second coupling resistor is connected between the other terminal of the first current sense resistor and the other terminal of the summing resistor;
the third coupling resistor is connected between one terminal of the second current sense resistor and the one terminal of the summing resistor; and
the fourth coupling resistor is connected between the other terminal of the second current sense resistor and the other terminal of the summing resistor.

10. The system of claim 9, wherein:
the switch elements include transistors; and
the switches have respective switch-control inputs, the control output of the controller and the switch control inputs being coupled to each other via electrical paths containing no active circuit elements.

11. The system of claim 10, wherein:
the transistors comprise FETs.

12. The system of claim 9, wherein:
the sense voltage comprises a scaled sum of the voltages that appear across the first and second current sense resistors.

13. The system of claim 9, wherein:
at least one of the current sense resistors is not physically proximate to the control circuitry sense inputs.

14. The system of claim 9, wherein:
at least one of the current sense resistors is located at least twice as far from the control circuitry sense inputs as is the summing resistor.

15. The systems of claim 9, wherein:
both of the current sense resistors are located at least twice as far from the control circuitry sense inputs as is the summing resistor.

16. The system of claim 9, wherein:
at least one of the current sense resistors is not as close to the control circuitry sense inputs as is the summing resistor.

* * * * *

UNITED STATES PATENT AND TRADEMARK OFFICE
CERTIFICATE OF CORRECTION

PATENT NO. : 8,976,499 B2
APPLICATION NO. : 12/768242
DATED : March 10, 2015
INVENTOR(S) : Kelly Pracht et al.

It is certified that error appears in the above-identified patent and that said Letters Patent is hereby corrected as shown below:

In the claims

In column 6, line 37 approx., in Claim 15, delete "systems" and insert -- system --, therefor.

Signed and Sealed this
Twentieth Day of October, 2015

Michelle K. Lee
*Director of the United States Patent and Trademark Office*